Nov. 9, 1948.    R. D. HARRIS    2,453,316
BUFFING MACHINE
Filed Oct. 2, 1946    4 Sheets-Sheet 1
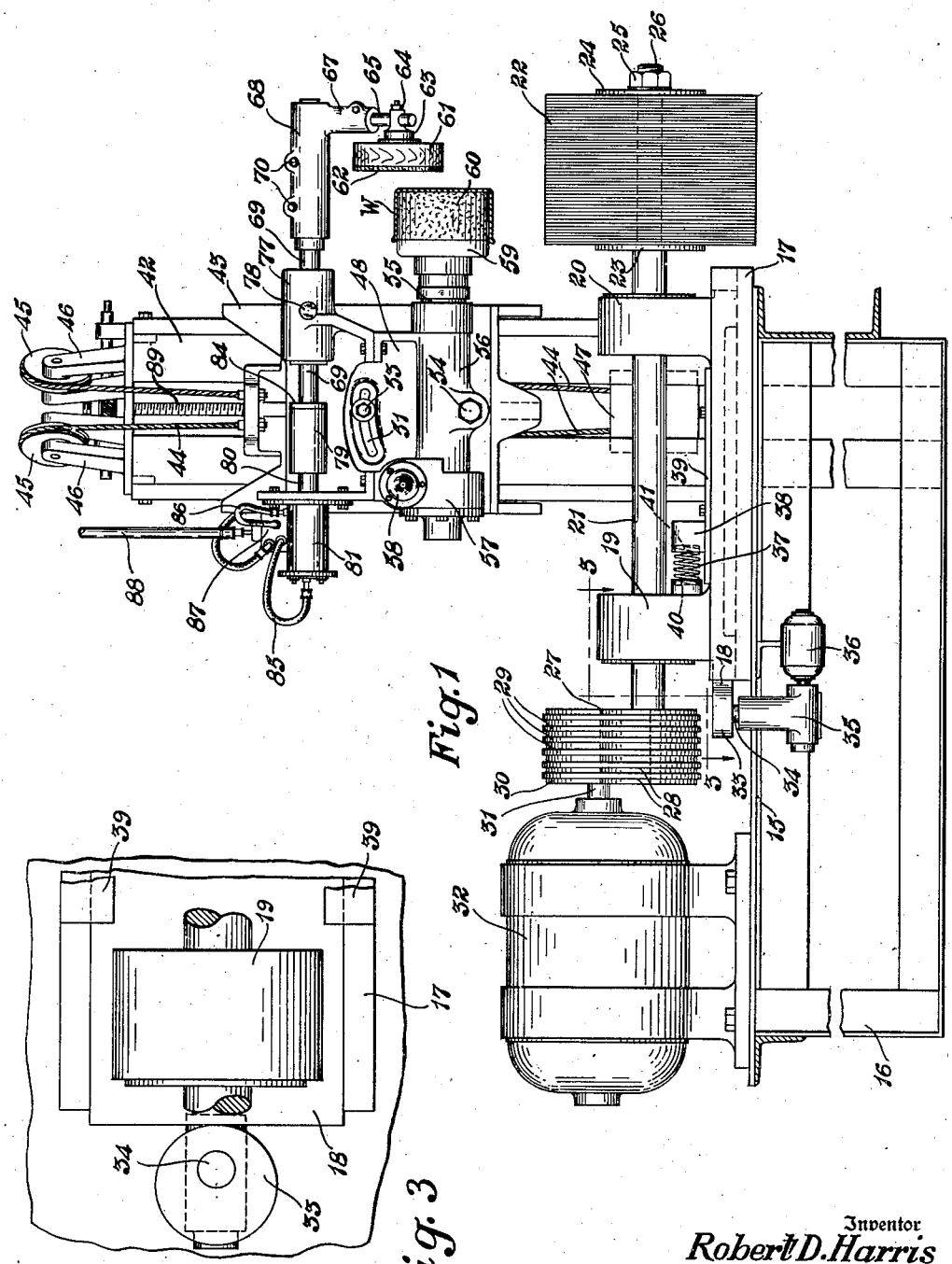
Inventor
Robert D. Harris
By
Frease and Bishop
Attorneys Nov. 9, 1948.     R. D. HARRIS     2,453,316
BUFFING MACHINE
Filed Oct. 2, 1946                                4 Sheets-Sheet 2
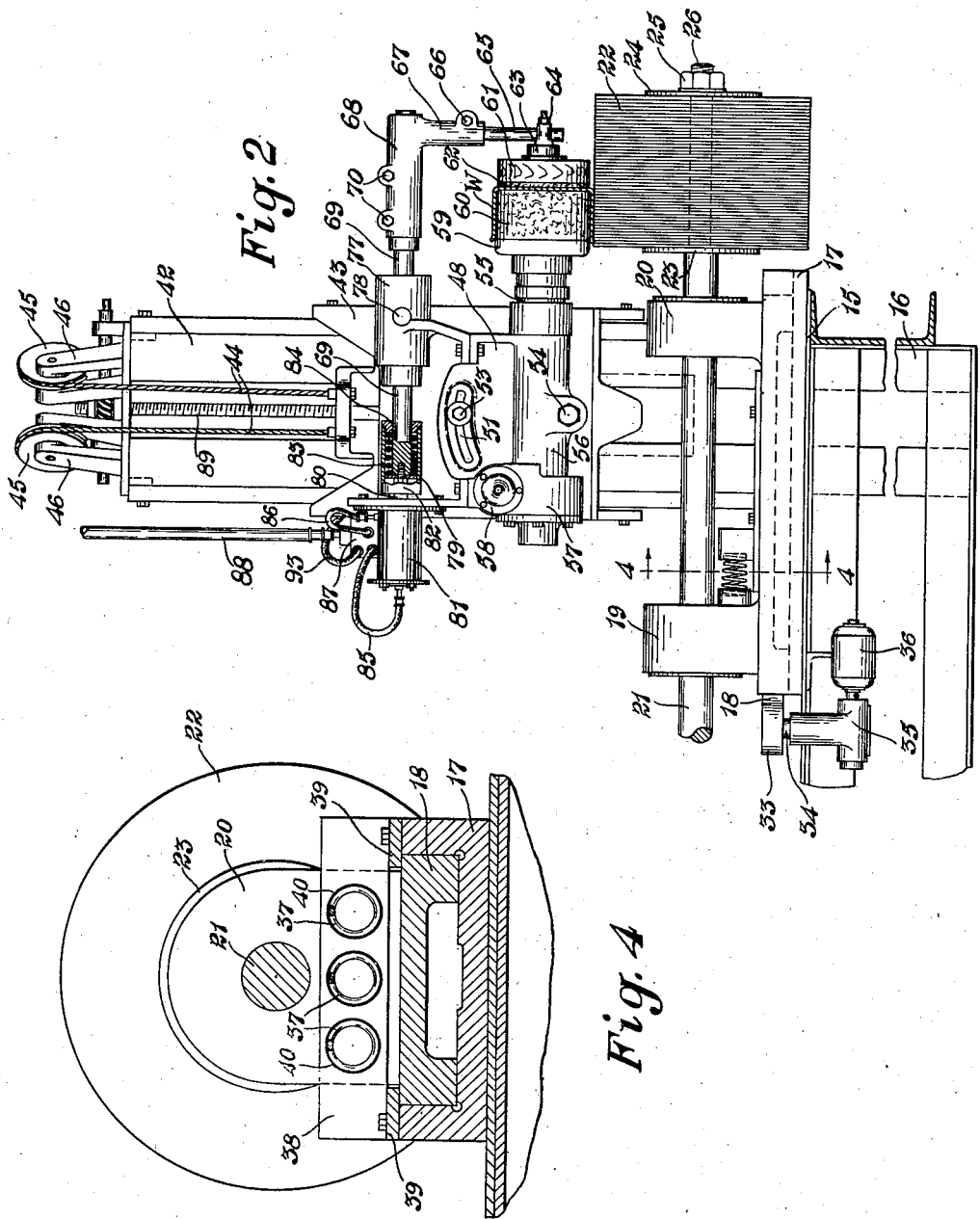
Inventor
Robert D. Harris
By Frease and Bishop
Attorneys Nov. 9, 1948.     R. D. HARRIS     2,453,316
BUFFING MACHINE
Filed Oct. 2, 1946     4 Sheets-Sheet 3
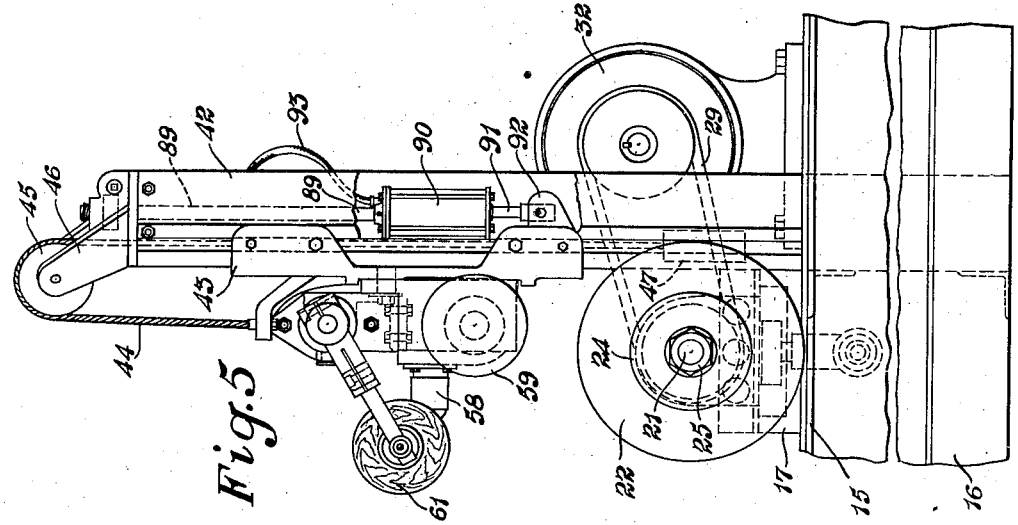
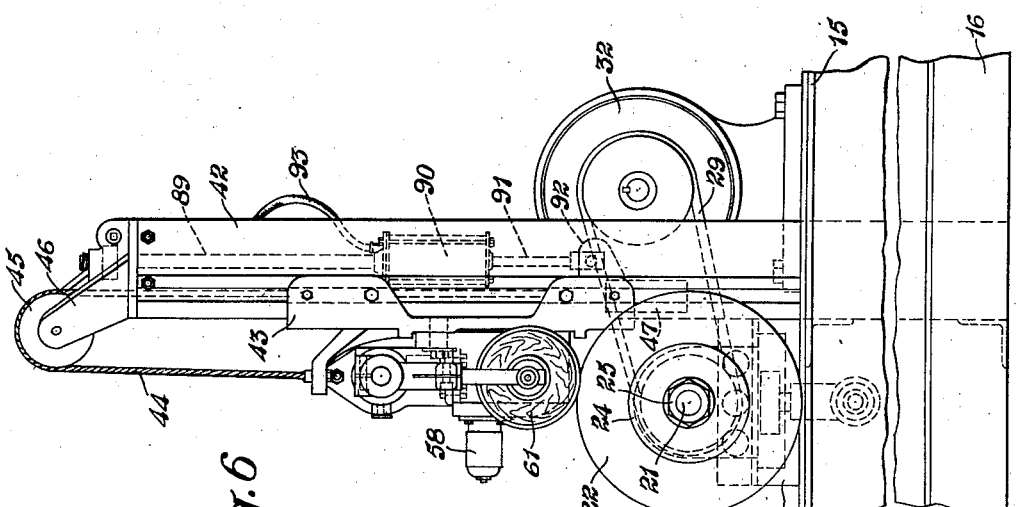
Inventor
Robert D. Harris
By Frease and Bishop
Attorneys Nov. 9, 1948.  R. D. HARRIS  2,453,316
BUFFING MACHINE
Filed Oct. 2, 1946  4 Sheets-Sheet 4
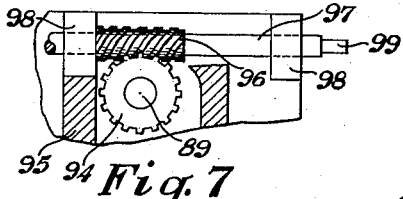
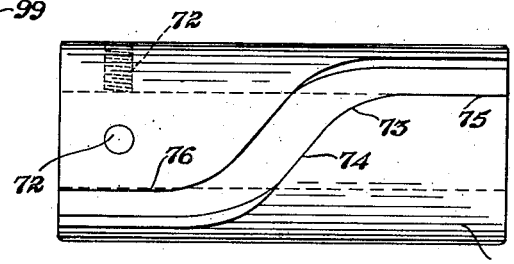
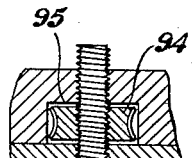
Fig. 7
Fig. 9
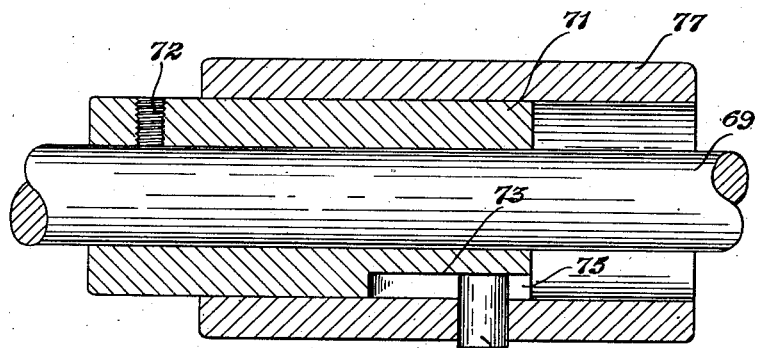
Fig. 10
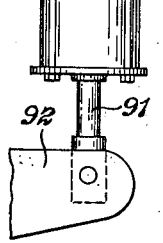
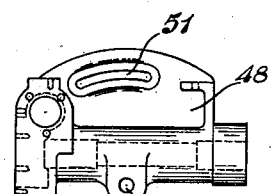
Fig. 8
Fig. 11
Fig. 12
Inventor
Robert D. Harris
By Frease and Bishop
Attorneys Patented Nov. 9, 1948

2,453,316

UNITED STATES PATENT OFFICE 2,453,316

BUFFING MACHINE

Robert D. Harris, Massillon, Ohio, assignor to The Enterprise Aluminum Company, Massillon, Ohio, a corporation of Ohio Application October 2, 1946, Serial No. 700,726

14 Claims. (Cl. 51—50)

The invention relates to buffing machines and more particularly to a machine for buffing hollow sheet metal ware such as aluminum cooking utensils and the like.

The object of the invention is to provide an apparatus including a rotatable chuck for receiving hollow ware to be buffed, a rotatable buffing wheel, means for moving the chuck relative to the buffing wheel to bring the ware into contact therewith and means for returning the chuck to initial position spaced from the buffing wheel when the buffing operation is completed.

Another object is to provide a cam operated pressure pad for automatic movement toward the chuck when the chuck is moved to operative position relative to the buffing wheel, for holding the ware upon the chuck during the buffing operation.

A further object is to provide apparatus of this character in which the buffing wheel is reciprocated axially during the buffing operation, while the ware is rotated upon a stationary axis thus preventing the formation of grooves or lines in the buffed surface of the ware.

A still further object is to provide cam means for reciprocating the buffing wheel while the same is rotated.

Another object is to provide an apparatus of this character having a vertical slide casting carrying the work holding chuck and the pressure pad.

A further object is to provide means for adjusting the vertical movement of the vertical slide casting.

A still further object is to provide means for angularly adjusting the vertical slide casting.

Another object is to provide fluid operated cylinders for operating the pressure pad and the vertical slide casting and a four-way valve for simultaneously operating both cylinders.

Still another object is to provide a slidable main drive bearing mounted in a horizontal slide base provided with eccentric cam and spring means for continually reciprocating the same.

A further object is to provide an apparatus of this character in which the vertical slide casting carrying the ware holding chuck and the pressure pad is counter balanced upon the vertical frame of the machine and the fluid cylinder which operates the vertical slide casting is provided with a worm and screw adjustment for adjusting the throw of the vertical slide casting.

The above objects together with other which will be apparent for the drawing and following description or which may be later referred to, may be attained by constructing the improved buffing machine in the manner hereinafter described in detail and illustrated in the accompanying drawing in which:

Figure 1 is a front elevation of the improved buffing machine in the normal or intital position;

Fig. 2 a similar view showing the machine in the operated position;

Fig. 3 an enlarged, fragmentary plan sectional view of a portion of the slide base for the main drive and the slidable main drive bearing casting and the eccentric cam for reciprocating the same;

Fig. 4 an enlarged, transverse, vertical section through the slide base and the main drive;

Fig. 5 a side elevation of the machine in the initial position as shown in Fig. 1;

Fig. 6 a similar view in the operated position as shown in Fig 2;

Fig. 7 a fragmentary, horizontal, sectional view through the worm screw and gear adjustment upon the shaft of the vertical elevating cylinder;

Fig. 8 a side elevation, partly in section, of the vertical elevating cylinder and shaft showing the worm gear adjustably mounted upon the threaded upper end of the shaft;

Fig. 9 a side elevation of the cam which operates the pressure pad;

Fig. 10 a longitudinal sectional view through the cam shown in Fig. 9 and the housing therefor;

Fig. 11 a front elevation of the vertical slide casting; and,

Fig. 12 a front elevation of the angularly adjustable spindle bearing casting for the work holding chuck.

The machine is assembled upon a horizontal bed or table 15 which may be supported at any suitable height above the floor as by the frame 16 and has fixed thereon at one end, the horizontally disposed channel shaped slide base 17 for the slidable main drive casting or bracket 18, upon opposite end portions of which are formed the upright main shaft bearings 19 and 20 through which is journalled the horizontal main drive shaft 21.

A buffing wheel, formed of a plurality of discs of paper or the like, as in usual practice, is fixed upon the outer end portion of the main drive shaft 21, beyond the outer end of the main drive casting or bracket 18, this buffing wheel being indicated generally at 22.

The paper discs are clamped together upon the shaft as by the metal washers or flange plates 23 and 24 and the nut 25 located upon the threaded outer end 26 of the main drive shaft.

The inner end of the main drive shaft 21 has a pulley 27 fixed thereon and preferably provided with a plurality of V-grooves 28 for receiving a plurality of V-belts 29 which are located over the drive pulley 30 upon the shaft 31 of the main drive motor 32, which is mounted upon the bed or table 15 at a point beyond the inner end of the slide base 17.

An eccentric cam 33 is fixed upon the upper end of the vertical shaft 34 of the reducer 35, which is driven by the small motor 36 fixed to the under side of the bed or table, the cam 33 being held in contact with the inner or left hand end of the main drive casting or bracket by means of a plurality of coil springs 37 interposed between the bearing 19 of the main drive bracket and the cross bar 38 which is mounted in vertical position upon the machine being preferably fixed upon the top of the guide plates 39 which overhang the upper edges of the channel shaped slide base 17 and retain the main drive bracket 18 therein. Sockets 40 and 41 are provided in the main drive bearing 19 and the cross bar 38 respectively for housing opposite ends of the springs.

With this construction, as the motors 32 and 36 are operated the main drive shaft 21, carrying the buffing wheel 22, will be continually rotated through the pulley 30, belts 29 and pulley 27 and the eccentric cam 33 will be continually rotated through the motor 36 and reducer 35, the springs 37 holding the sliding main drive bracket 18 in contact with the periphery of the cam 33 so that the main drive bracket and the buffing wheel 22 carried thereby will continually reciprocate in a horizontal plane, the belts 29 having sufficient flexibility to permit of the longitudinal movement of the pulley 22 relative to the pulley 30.

A vertical frame or elevating casting 42 is fixed upon the outer end portion of the bed or table 15, to the rear of the slide base 17 for the main drive bracket, and the vertical slide casting indicated generally at 43 is vertically slidably mounted and counter balanced by means of the chains or cables 44 connected to the upper end of the vertical slide casting 43, extending upward over the pulleys 45, journalled in brackets 46 upon the top of the vertical frame 42, and extending downward on the rear side thereof, the lower ends of said cables or chains being connected to the counter weight 47.

An angularly adjustable spindle bearing casting 48, for the spindle or the work holding chuck, is mounted upon the front of the vertical slide casting 43 and for the purpose of adjusting the same angularly upon the vertical slide casting, to accommodate tapered ware, the vertical slide casting 43 is provided with the vertically spaced horizontal upper and lower slots 49 and 50 and the spindle bearing casting 48 is provided with the arcuate upper slot 51 and the lower aperture 52.

Bolts 53 and 54 are located through the arcuate slot 51 and upper horizontal slot 49 and through the aperture 52 and lower horizontal slot 50 to hold the spindle bearing bracket 48 in adjusted position upon the vertical slide casting 43.

The ware chuck spindle 55 is journalled through the bearing 56 in the spindle bearing casting and is operatively connected in conventional manner with a worm gear reducer located in the housing 57, which is driven by the small motor 58 mounted upon the bracket 48 so as to rotate the ware holding chuck 59 at desired relative speed and preferably in opposite direction to the buffing wheel 22.

The chuck 59 is removably mounted upon the spindle 55 in any conventional manner so that the chuck may be easily removed and replaced as a different size and shape of chuck is required for each size and shape of hollow ware to be buffed.

For the purpose of frictionally holding the hollow metal ware, indicated at W upon the chuck during the buffing operation, a friction surface 60 of fabric or the like may cover the outside of the chuck for frictional contact with the interior of the hollow metal ware.

In order to hold the ware in proper position upon the chuck during the buffing operation, a pressure block 61 is provided which is preferably formed of wood or the like, or cylindrical shape and preferably having a pad 62 of felt or the like upon its flat face adapted for contact with the bottom end of the hollow ware W.

This block 61 is mounted upon a spindle 63 and may be rotatable thereon if desired. The spindle 63 is adjustably mounted, by means of the adjusting screw 64, upon the rod 65 which is clamped, as by the bolt 66, into the end portion of the radial arm 67 of the angular casting 68 which is clamped upon the spindle 69 as by the bolt 70.

The spindle 69, as best shown in Fig. 10, has a hollow cylindrical cam 71 fixed thereon as by the set screws 72 and a cam groove 73 is formed in the outer surface of the cylindrical cam and comprises the central spiral portion 74 and the straight end portions 75 and 76.

This cylindrical cam is slidably and rotatably journalled within a bearing 77, fixed upon the vertical slide casting 43, and having a pin 78 therein engaging the cam groove 73 so that as the cam 71 is longitudinally reciprocated through the bearing 77, the cam 71 and spindle 69 will be given a partial rotation.

The inner end of the spindle 69 is slidably located within a cylindrical housing 79 fixed to the end of the piston rod 80 of the fluid cylinder 81 and a head or shoulder 82 is fixed upon the inner end of the spindle 69, a coil spring 83 being interposed between said shoulder and the outer head 84 of the cylinder 79 so as to normally urge the spindle 69, and the parts carried thereby inward or toward the left relative to the cylinder 79.

The fluid cylinder 81 is a double acting cylinder, the opposite ends of which are connected by hose lines 85 and 86 with the four-way valve 87. Pressure fluid is admitted to the valve 87 through the pipe 88 leading from any suitable source of fluid pressure.

In the normal or initial position, as shown in Figs. 1 and 5, the radial arm 67 carrying the pressure block 61 is located outwardly at an angle so that the pressure block is raised above and located outwardly from the axis of the ware holding chuck 59.

Also in this position the spindle 69 carrying the pressure pad arm is located outwardly or to the right as viewed in Figs. 1 and 2 so that the pressure pad is located in a plane beyond the end of the ware holding chuck as best shown in Fig. 1.

For the purpose of vertically reciprocating the vertical slide casting 43, an elevating screw 89 is suspended from the upper end of the elevating casting or frame 42 and has a fluid cylinder 90 connected to its lower end. The piston rod 91 of the cylinder extends through the lower head thereof and is connected to the ears 92 upon the rear side of the vertical slide casting 43.

A hose line 93 connects the upper end of the cylinder 90 with the four-way valve 87. The counter weight 47 normally holds the vertical slide casting 43 in the raised position, as shown in Fig. 5, and when the four-way valve 87 is operated to admit fluid to the upper end of the cylinder 90 the piston rod 91 is forced downward moving the vertical slide casting 43 downward against the pull of the counter weight, to the position shown in Figs. 2 and 6.

For the purpose of adjusting the throw of the piston rod 91 to compensate for ware of varying diameters, the elevating screw 89 is threaded through the elevating worm gear 94, journalled within the gear housing 95 in the upper end of the vertical frame or casting 42.

This worm gear is in mesh with the elevating worm screw 96, upon the elevating shaft 97 journalled in bearings 98 in the housing 95 and having a squared end 99 upon which a wrench or other suitable tool may be placed for rotating the worm 96 and through it the worm gear 94 to raise or lower the elevating screw 89 and with it the fluid cylinder 90, to obtain the desired adjustment.

With the machine in the initial position, as shown in Figs. 1 and 5, assuming that it is desired to operate the same to buff pieces of hollow metal ware such as indicated at W, the motors 32, 36 and 58 are operated causing the buffing wheel 22 to be rapidly rotated and more slowly reciprocated horizontally, and causing the ware holding chuck 59 to be rotated at a different speed, or in the opposite direction to the buffing wheel, or both.

An article of ware as indicated at W is placed upon the chuck 59 as shown in Fig. 1 and the four-way valve 87 is operated simultaneously operating the pistons in the fluid cylinders 81 and 90.

With the operation of the cylinder 81 the piston rod 69 thereof is drawn to the left as viewed in Fig. 1, causing the pin 78 and cam slot 73 to rotate the spindle in counter clockwise direction as viewed in Figs. 5 and 6, moving the pressure pad 61 from the position shown in Figs. 1 and 5 to that shown in Figs. 2 and 6, bringing said pressure pad into axial alignment with the chuck and at the same time moving it inward or to the left so as to contact the bottom of the ware W upon the chuck and hold the same against displacement.

At the same time the operation of the fluid cylinder 90 will force the piston rod 91 thereof downward moving the vertical slide casting 43 downward bringing the rotating ware upon the chuck into contact with the periphery of the rotating and reciprocating buffing wheel 22 as shown in Figs. 2 and 6.

The peripheral surface of the ware upon the chuck will be rapidly buffed and polished, and due to the continual reciprocation of the buffing wheel, there will be no circular lines or marks formed upon the surface of the ware.

Within a few seconds the ware is properly buffed when the four-way valve 87 may be operated in reverse direction, causing the fluid cylinder 81 to force its piston rod 80 outward or to the right and through the pin 78 and cam 71 swinging the pressure pad 61 upward and outward away from the chuck.

At the same time the fluid pressure in the cylinder 90 is released permitting the counter weight 47 to raise the elevating casting 43 to the initial position shown in Figs. 1 and 5 when another piece of ware may be placed upon the chuck and the operation repeated.

I claim:

1. A buffing machine for buffing hollow ware, including a buffing wheel, means for rotating the buffing wheel, means for axially reciprocating the buffing wheel while it is being rotated, a ware chuck adapted to receive hollow ware to be buffed, means for rotating said chuck, means for normally holding the chuck spaced from the buffing wheel, a pressure pad, means for normally holding the pressure pad spaced longitudinally and laterally from the chuck, and fluid pressure and cam means for simultaneously moving the pressure pad into contact with the bottom of hollow ware upon the chuck and moving the chuck toward the buffing wheel to bring the surface of the hollow ware upon the chuck into contact with the buffing wheel.

2. A buffing machine for buffing hollow ware, including a buffing wheel, means for rotating the buffing wheel, cam means for axially reciprocating the buffing wheel while it is being rotated, a ware chuck adapted to receive hollow ware to be buffed, means for rotating said chuck, means for normally holding the chuck spaced from the buffing wheel, a pressure pad, means for normally holding the pressure pad spaced longitudinally and laterally from the chuck, and means including a fluid pressure operated cam for simultaneously moving the pressure pad into contact with the bottom of hollow ware upon the chuck and moving the chuck toward the buffing wheel to bring the surface of the hollow ware upon the chuck into contact with the buffing wheel.

3. A buffing machine for buffing hollow ware, including a buffing wheel, means for rotating the buffing wheel, eccentric cam means for axially reciprocating the buffing wheel while it is being rotated, a ware chuck adapted to receive hollow ware to be buffed, means for rotating said chuck, means for normally holding the chuck spaced from the buffing wheel, a pressure pad, means for normally holding the pressure pad spaced longitudinally and laterally from the chuck, and fluid pressure means for moving the pressure pad into contact with the bottom of hollow ware upon the chuck and fluid pressure means for moving the chuck toward the buffing wheel to bring the surface of the hollow ware upon the chuck into contact with the buffing wheel.

4. A buffing machine for buffing hollow ware, including a buffing wheel, means for rotating the buffing wheel, means for axially reciprocating the buffing wheel while it is being rotated, a ware chuck adapted to receive hollow ware to be buffed, means for rotating said chuck, means for normally holding the chuck spaced from the buffing wheel, a pressure pad, means for normally holding the pressure pad spaced longitudinally and laterally from the chuck, and fluid pressure means for moving the pressure pad into contact with the bottom of hollow ware upon the chuck and fluid pressure means moving the chuck toward the buffing wheel to bring the surface of the hollow ware upon the chuck into contact with the buffing wheel.

5. A buffing machine for buffing hollow ware, including a buffing wheel, means for rotating the buffing wheel, means for axially reciprocating the buffing wheel while it is being rotated, a ware chuck adapted to receive hollow ware to be buffed, means for rotating said chuck, means for normally holding the chuck spaced from the buffing wheel, a pressure pad, means for normally holding the pressure pad spaced longitudinally and laterally from the chuck, and means including a fluid pressure operated cam for simultaneously moving the pressure pad into contact with the bottom of hollow ware upon the chuck and moving the chuck toward the buffing wheel to bring the surface of the hollow ware upon the chuck into contact with the buffing wheel.

6. A buffing machine for buffing hollow ware, including a buffing wheel, means for rotating the buffing wheel, means for axially reciprocating the buffing wheel while it is being rotated, a ware chuck adapted to receive hollow ware to be buffed, means for rotating said chuck, means for normally holding the chuck spaced from the buffing wheel, a pressure pad, means for normally holding the pressure pad spaced from the chuck, and fluid pressure and cam means for simultaneously moving the pressure pad into contact with the bottom of hollow ware upon the chuck and moving the chuck toward the buffing wheel to bring the surface of the hollow ware upon the chuck into contact with the buffing wheel.

7. A buffing machine for buffing hollow ware, including a buffing wheel, means for rotating the buffing wheel, means for axially reciprocating the buffing wheel while it is being rotated, a ware chuck adapted to receive hollow ware to be buffed, means for rotating said chuck, means for normally holding the chuck spaced from the buffing wheel, a pressure pad, means for normally holding the pressure pad spaced from the chuck, fluid cylinder operated means for moving the pressure pad into contact with the bottom of the hollow ware upon the chuck, a second fluid cylinder operated means for moving the chuck toward the buffing wheel to bring the surface of the hollow ware upon the chuck into contact with the buffing wheel, and a four-way valve for simultaneously operating both of the fluid cylinders.

8. A buffing machine for buffing hollow ware, including a buffing wheel, means for rotating the buffing wheel, means for axially reciprocating the buffing wheel while it is being rotated, a ware chuck adapted to receive hollow ware to be buffed, means for rotating said chuck, means for normally holding the chuck spaced from the buffing wheel, a pressure pad, means for normally holding the pressure pad spaced from the chuck, fluid cylinder operated means including a cam for moving the pressure pad into contact with the bottom of the hollow ware upon the chuck, a second fluid cylinder operated means for moving the chuck toward the buffing wheel to bring the surface of the hollow ware upon the chuck into contact with the buffing wheel, and a four-way valve for simultaneously operating both of the fluid cylinders.

9. A buffing machine for buffing hollow ware, including a slide base, a bearing bracket slidable on said slide base, a shaft journalled in said bearing bracket, a buffing wheel upon said shaft, means for rotating said shaft, a cam operatively engaging the bearing bracket, means for rotating said cam to reciprocate said bearing bracket, a ware chuck adapted to receive hollow ware to be buffed, means for rotating said chuck, means for normally holding the chuck spaced from the buffing wheel, a pressure pad, means for normally holding the pressure pad spaced longitudinally and laterally from the chuck, fluid cylinder operated means for moving the pressure pad into contact with the bottom of hollow ware upon the chuck and second fluid cylinder operated means for moving the chuck toward the buffing wheel to bring the surface of the hollow ware upon the chuck into contact with the buffing wheel and a value for simultaneously operating both of the fluid cylinders.

10. A buffing machine for buffing hollow ware, including a slide base, a bearing bracket slidable on said slide base, a shaft journalled in said bearing bracket, a buffing wheel upon said shaft, means for rotating said shaft, a cam operatively engaging the bearing bracket, spring means for holding the bearing bracket in contact with the cam, means for rotating said cam to reciprocate said bearing bracket, a ware chuck adapted to receive hollow ware to be buffed, means for rotating said chuck, means for normally holding the chuck spaced from the buffing wheel, a pressure pad, means for normally holding the pressure pad spaced from the chuck, and means for simultaneously moving the pressure pad into contact with the bottom of hollow ware upon the chuck and moving the chuck toward the buffing wheel to bring the surface of the hollow ware upon the chuck into contact with the buffing wheel.

11. A buffing machine for buffing hollow ware, including a buffing wheel, means for rotating the buffing wheel, means for axially reciprocating the buffing wheel while it is being rotated, a ware chuck adapted to receive hollow ware to be buffed, means for angularly adjusting the chuck relative to the buffing wheel, means for rotating said chuck, means for normally holding the chuck spaced from the buffing wheel, a pressure pad, means for normally holding the pressure pad spaced longitudinally and laterally from the chuck, fluid cylinder operating means for moving the pressure pad into contact with the bottom of hollow ware upon the chuck and a second fluid cylinder operated means for moving the chuck toward the buffing wheel to bring the surface of the hollow ware upon the chuck into contact with the buffing wheel and a value for simultaneously operating both of the fluid cylinders.

12. A buffing machine for buffing hollow ware, including a bed, a horizontally disposed slide base upon the bed, a bearing bracket slidable upon said slide base, a shaft journalled in said bearing bracket, a buffing wheel upon said shaft, means for rotating said shaft, an eccentric cam operatively engaging said bearing bracket, means for rotating said cam to reciprocate said bearing bracket, a vertical frame mounted upon the bed, a vertical slide casting slidable upon said vertical frame, counter-weight means for normally holding the vertical slide casting in raised position, a fluid cylinder for lowering the vertical slide casting, a ware chuck journalled upon said vertical slide frame for receiving hollow ware, a spindle slidably and rotatably mounted upon said vertical slide casting, cam means for rotating the spindle upon its axis when it is moved axially, a fluid cylinder for axially moving the spindle, a radial arm carried by the spindle, a pressure pad upon said radial arm normally located spaced from the chuck, and means for operating said fluid cylinders for moving the pressure pad into contact with the bottom of the hollow ware upon the chuck and for moving the chuck toward the buffing wheel to bring the surface of the hollow ware upon the chuck into contact with the buffing wheel.

13. A buffing machine for buffing hollow ware, including a bed, a horizontally disposed slide base upon the bed, a bearing bracket slidable upon said slide base, a shaft journalled in said bearing bracket, a buffing wheel upon said shaft, means for rotating said shaft, an eccentric cam operatively engaging said bearing bracket, means for rotating said cam to reciprocate said bearing bracket, a vertical frame mounted upon the bed, a vertical slide casting slidable upon said vertical frame, counter-weight means for normally holding the vertical slide casting in raised position, a fluid cylinder for lowering the vertical slide casting, a ware chuck journalled upon said vertical slide frame for receiving hollow ware, a spindle slidably and rotatably mounted upon said vertical slide casting, cam means for rotating the spindle upon its axis when it is moved axially, a fluid cylinder for axially moving the spindle, a radial arm carried by the spindle, a pressure pad upon said radial arm normally located spaced from the chuck, and a four-way valve for simultaneously operating said fluid cylinders for moving the pressure pad into contact with the bottom of the hollow ware upon the chuck and for moving the chuck toward the buffing wheel to bring the surface of the hollow ware upon the chuck into contact with the buffing wheel.

14. A buffing machine for buffing hollow ware, including a bed, a horizontally disposed slide base upon the bed, a bearing bracket slidable upon said slide base, a shaft journalled in said bearing bracket, a buffing wheel upon said shaft, means for rotating said shaft, an eccentric cam operatively engaging said bearing bracket, means for rotating said cam to reciprocate said bearing bracket, a vertical frame mounted upon the bed, a vertical slide casting slidable upon said vertical frame, counter-weight means for normally holding the vertical slide casting in raised position, a fluid cylinder for lowering the vertical slide casting, a ware chuck journalled upon said vertical slide frame for receiving hollow ware, means for angularly adjusting the chuck relative to the buffing wheel, a spindle slidably and rotatably mounted upon said vertical slide casting, cam means for rotating the spindle upon its axis when it is moved axially, a fluid cylinder for axially moving the spindle, a radial arm carried by the spindle, a pressure pad upon said radial arm normally located spaced from the chuck, and means for operating said fluid cylinders for moving the pressure pad into contact with the bottom of the hollow ware upon the chuck and for moving the chuck toward the buffing wheel to bring the surface of the hollow ware upon the chuck into contact with the buffing wheel.

ROBERT D. HARRIS.

REFERENCES CITED

The following references are of record in the file of this patent:

UNITED STATES PATENTS

| Number | Name | Date |
| --- | --- | --- |
| 835,320 | Pomeroy | Nov. 6, 1906 |
| 1,115,640 | Winter | Nov. 3, 1914 |
| 1,477,426 | Carlson | Dec. 11, 1923 |
| 1,509,904 | Salisbury | Sept. 30, 1924 |
| 1,515,640 | Wheaton | Nov. 18, 1924 |
| 2,161,947 | Bower | June 13, 1939 |
| 2,331,089 | Flygare et al. | Oct. 5, 1943 |